G. R. Stevens,
Shoeing Horses.
N° 29,016. Patented July 3, 1860.

Witnesses
Goodwin V. Atlee
R. W. Fenwick

Inventor
George R. Stevens

UNITED STATES PATENT OFFICE.

GEORGE R. STEVENS, OF CLARKSVILLE, MISSOURI.

IMPROVEMENT IN SHOEING HORSES.

Specification forming part of Letters Patent No. 29,016, dated July 3, 1860.

*To all whom it may concern:*

Be it known that I, GEORGE R. STEVENS, of Clarksville, in the county of Pike and State of Missouri, have invented a new and useful Improvement in Horseshoeing-Machines; and I do hereby declare that the following is a full, clear, and exact description of the same, reference being had to the accompanying drawings, forming a part of this specification, in which—

Figure 1:
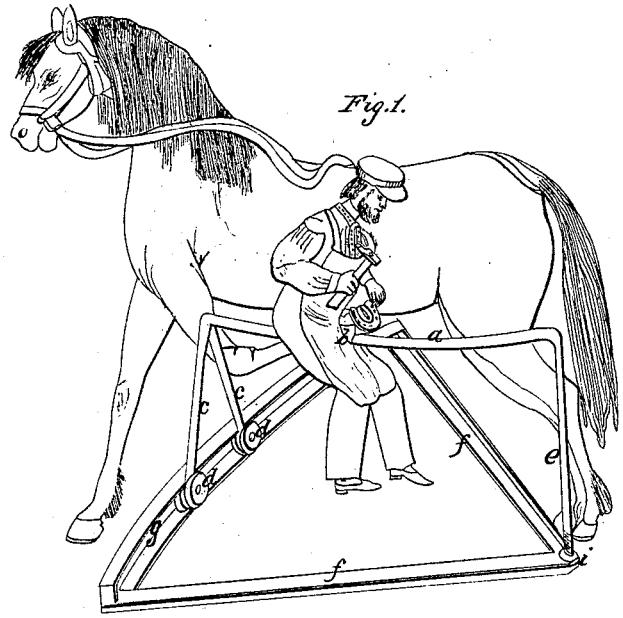
Figure 2:
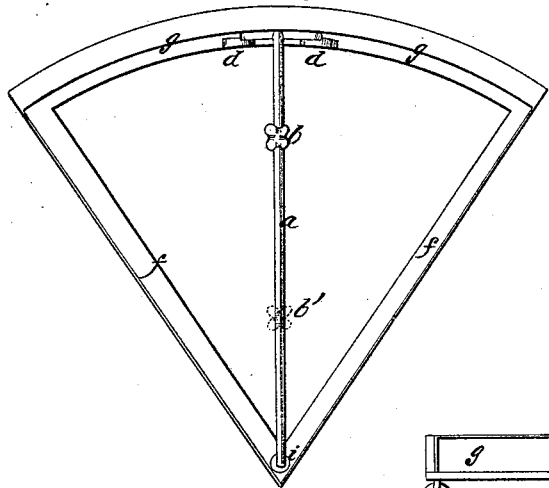
Figure 3:
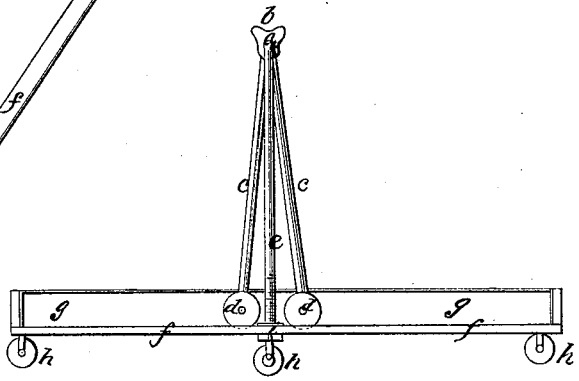

Figure 1 represents a perspective view, Fig. 2 a plan, and Fig. 3 an end view, of my apparatus for shoeing horses.

Similar letters of reference in each of the several figures indicate corresponding parts.

The nature of my invention consists in the combination of a sliding rest with a swinging frame, guide or rollers, and arched guideway, for the purpose of constructing an adjustable rest for a horse's foot while being shod.

To enable others skilled in the art to make and use my invention, I will proceed to describe its construction and operation.

The whole apparatus rests upon a three-sided frame, $f f g$, which rests on the ground, or may be placed on caster-rollers $h h h$, as indicated in Fig. 3, so as to increase the mobility of the apparatus. The front of the frame $f f g$ consists of an arched and grooved guideway $g$. Another frame, $e a c c$, is made of a horizontal rod, $a$, supported upon one leg, $e$, behind, and two inclined legs, $c c$, in front. The leg $e$ is pivoted at the rear end of frame $f f g$, and the lower ends of the legs $c c$ are provided with friction-rollers $d d$, which run in the grooved guideway $g$, the curvature of which guideway is a circle with the center at $i$. Thus it will be seen the frame $e a c c$ can freely swing the whole extent of arch $g$, the leg $e$ serving as the center axis of motion, and the rollers $d d$, at the ends of the front edges, $c c$, traveling and relieving the friction in the groove of arch $g$.

The rest $b$, which is intended to receive the horse's foot, as represented in Fig. 1, may be moved back and forth upon the rod $a$, the rod passing through a hole in the rest. As the rest can be moved forward or backward upon rod $a$, and this rod can swing to the right or left with $e$ as a center axis, the rest can always and easily be adjusted, and will to some extent adjust itself to all the movements of the horse, whether it moves to either side or backward or forward, so that the process of shoeing the horses can be proceeded with without interruption. By using the additional caster-rollers $h h h$, the whole apparatus can be moved about more readily whenever the horse by its movements should have run out the length of arch $g$ or of rod $a$.

My invention is very useful to the smith, because it gives him complete control of the horse and saves him the labor of supporting the horse's foot, and also from the pull and strain of the horse while shoeing him. It also saves the smith from having his legs torn and lacerated by the nails of the shoe when the horse becomes restless and unmanageable. It also affords more comfort and safety to the horse while being shod, as his leg is held firmly on the rest, although the rest accommodates itself to the movements of the horse.

What I claim as my invention, and desire to secure by Letters Patent, is—

The combination of a sliding rest, $b$, with a swinging frame, $e a c c$, guide or rollers $d d$, and arched guideway $g$, for the purpose of constructing an adjustable rest for a horse's foot while being shod, substantially as set forth.

GEORGE R. STEVENS.

Witnesses:
 GOODWIN Y. AT LEE,
 ROBT. W. FENWICK.